(12) United States Patent
Yarvis et al.

(10) Patent No.: US 7,471,633 B2
(45) Date of Patent: Dec. 30, 2008

(54) MULTICHANNEL, MESH ROUTER AND METHODS FOR PATH SELECTION IN A MULTICHANNEL MESH NETWORK

(75) Inventors: Mark Yarvis, Portland, OR (US); W. Steven Conner, Hillsboro, OR (US); Anand Rangarajan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 858 days.

(21) Appl. No.: 11/030,593

(22) Filed: Jan. 4, 2005

(65) Prior Publication Data

US 2006/0146718 A1  Jul. 6, 2006

(51) Int. Cl.
H04L 12/28 (2006.01)
(52) U.S. Cl. .................... 370/238; 370/229
(58) Field of Classification Search ............ 370/389, 370/349, 229, 235, 238, 238.1, 351, 400, 370/401, 431, 437
See application file for complete search history.

(56) References Cited

U.S. PATENT DOCUMENTS

| | | | | |
|---|---|---|---|---|
| 5,649,108 | A * | 7/1997 | Spiegel et al. | 709/241 |
| 6,363,319 | B1 * | 3/2002 | Hsu | 701/202 |
| 6,580,979 | B2 * | 6/2003 | Payton et al. | 701/25 |
| 6,606,303 | B1 * | 8/2003 | Hassel et al. | 370/238 |
| 6,621,795 | B1 | 9/2003 | Redi et al. | |
| 6,816,460 | B1 * | 11/2004 | Ahmed et al. | 370/238 |
| 7,246,172 | B2 * | 7/2007 | Yoshiba et al. | 709/233 |
| 2002/0061001 | A1 | 5/2002 | Garcia-Luna-Aceves et al. | |
| 2003/0161268 | A1 | 8/2003 | Larsson et al. | |
| 2003/0181211 | A1 | 9/2003 | Razavilar et al. | |
| 2003/0202476 | A1 | 10/2003 | Billhartz et al. | |
| 2004/0229566 | A1 | 11/2004 | Wang et al. | |
| 2006/0146712 | A1 | 7/2006 | Conner et al. | |

FOREIGN PATENT DOCUMENTS

| | | |
|---|---|---|
| EP | 1473894 A2 | 11/2004 |
| WO | WO-2004/014091 A1 | 2/2004 |
| WO | WO-2004/053940 A2 | 6/2004 |

(Continued)

OTHER PUBLICATIONS

De Couto, D. S., et al., "A High-Throughput Path Metric for Multi-Hop Wireless Routing", *Proceedings of the 9th Annual Conference on Mobile Computing and Networking (MobiCom '03)*, (2003), 134-146.

(Continued)

*Primary Examiner*—Brenda Pham
(74) *Attorney, Agent, or Firm*—Schwegman, Lundberg & Woessner, P.A.; Gregory J. Gorrie (57) ABSTRACT

A wireless mesh network router comprises at least one transceiver to receive a packet over a wireless communication channel and path selection circuitry. The packet identifies a source node and a destination node in a multichannel mesh network. The path selection circuitry combines a channel-metric matrix associated with the packet's source node and a channel-metric matrix associated with the packet's destination node to determine a bottleneck channel for the source-destination pair. The next-hop node and associated transmission channel may be selected from the destination node matrix based on the bottleneck channel.

28 Claims, 5 Drawing Sheets

FOREIGN PATENT DOCUMENTS

WO WO-2004/114690 A1 12/2004
WO WO-2006/074319 A1 7/2006

OTHER PUBLICATIONS

Draves, R., et al., "Routing in Multi-Radio, Multi-Hop Wireless Mesh Networks", *Proceedings of the 10th Annual International Conference on Mobile Computing and Networking (MobiCom '04)*, (2004), 114-126.

Peterson, L. L., et al., *In: Computer Networks: A Systems Approach*, Morgan Kaufmann Publishers, San Francisco, CA,(2003), 285-287.

Yarvis, M. D., et al., "Real-World Experiences With an Interactive Ad Hoc Sensor Network", *International Workshop on Ad Hoc Networking (IWAHN 2002)*, (Aug. 2002), 9 pgs.

"International Search Report for corresponding PCT Application No. PCT/US2006/000377", (Jun. 9, 2006), 4 pgs.

* cited by examiner

MULTICHANNEL, MESH ROUTER AND METHODS FOR PATH SELECTION IN A MULTICHANNEL MESH NETWORK

RELATED APPLICATIONS

This patent application is related to U.S. patent application Ser. No. 11/030,592, entitled "MULTICHANNEL MESH NETWORK, MULTICHANNEL MESH ROUTER AND METHODS FOR ROUTING USING BOTTLENECK CHANNEL IDENTIFIEERS" and filed concurrently herewith.

TECHNICAL FIELD

Some embodiments of the present invention pertain to wireless communications. Some embodiments pertain to packet forwarding in wireless mesh networks. Some embodiments pertain to multicarrier communications.

BACKGROUND

Some conventional communication networks route packets among nodes of the network using forwarding tables that are stored in the nodes. The forwarding tables generally identify a next-hop node based on the packet's destination. The next-hop node is generally the same for all packets having the same destination regardless of the packet's originating node. The forwarding tables are conventionally generated by selecting paths through the network in a hop-by-hop fashion based on next-hops with the lowest cost. In some wireless networks, this conventional forwarding approach may not select the best path through the network because the frequencies and/or time slots used by the communication links along a given path may interfere with each other resulting in increased packet delays, increased packet retransmissions, and/or reduced channel bandwidth.

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. Embodiments of the invention set forth in the claims encompass all available equivalents of those claims. Embodiments of the invention may be referred to, individually or collectively, herein by the term "invention" merely for convenience and without intending to voluntarily limit the scope of this application to any single invention or inventive concept if more than one is in fact disclosed.

Figure 1:
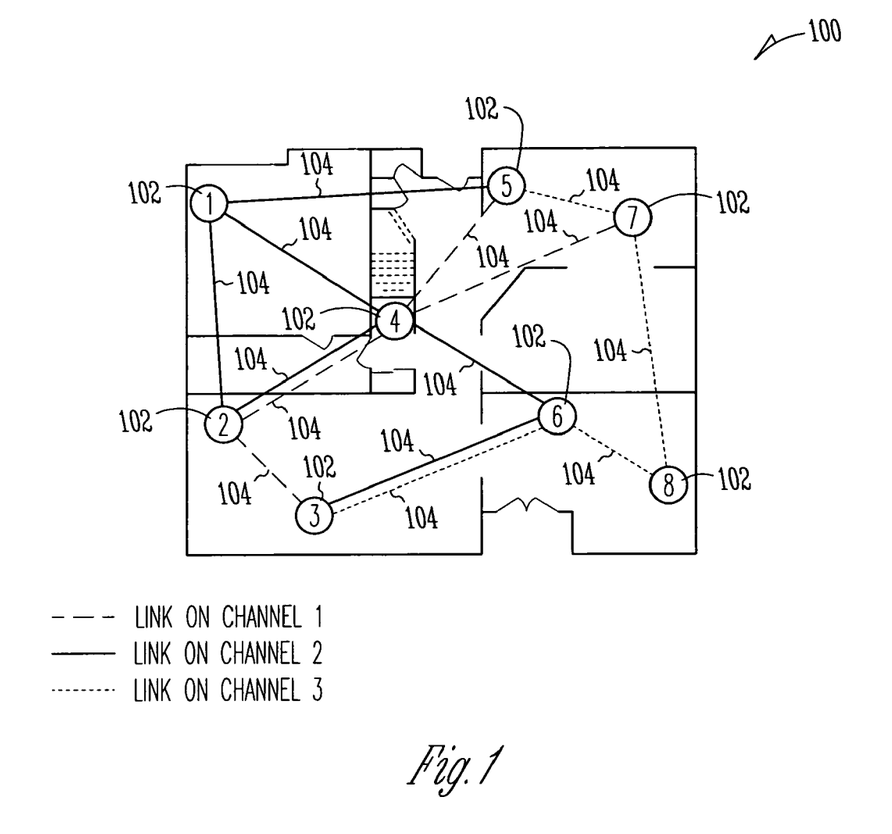
FIG. 1 illustrates a multichannel wireless mesh network in accordance with some embodiments of the present invention.

FIG. 1 illustrates a multichannel wireless mesh network in accordance with some embodiments of the present invention. Multichannel wireless mesh network 100 may comprise a plurality of wireless communication nodes 102 that may communicate with each other over one or more wireless communication channels 104. In some embodiments, at least some of wireless communication nodes 102 communicate with other nodes 102 using more than one wireless communication channel 104. In some embodiments, some wireless communication nodes 102 communicate with other nodes 102 using only one communication channel, although the scope of the invention is not limited in this respect.

For example, in network 100, node five may communicate with node four using a first communication channel (e.g., channel one), node five may communicate with node one using a second communication channel (e.g., channel two), and node five may communicate with node seven using a third communication channel (e.g., channel three). Node one, for example, may communicate with nodes two, four and five using only the first channel (e.g., channel one). Node three, for example, may communicate with node two using the first communication channel (e.g., channel one) and may communicate with node six using both the second and third communication channels (e.g., channels two and three). Although FIG. 1 illustrates a mesh network utilizing three communication channels, the scope of the invention is not limited in this respect. Some embodiments of the present invention are equally applicable to any mesh network utilizing one or more communication channels.

The use of two or more orthogonal wireless communication channels in mesh network 100 may significantly increase the ability of nodes 102 to communicate and route packets therebetween. In a single-channel mesh network, any one node's transmission on a particular communication channel may potentially interfere with other node's communicating on that channel depending on the distance between nodes in network 100. This may result in increased collisions, increased dropped packets, and increased packet retransmissions throughout the entire network.

In accordance with some embodiments of the present invention, nodes 102 may communicate with each other using more than one communication channel. In accordance with some embodiments of the present invention, nodes 102 may generate channel-metric matrices for each possible destination in network 100. The channel-metric matrices identify next-hop nodes and a communication channel for each possible bottleneck channel. An intermediate node on a route may select a next-hop node and one of communication channels 104 for forwarding a received packet based on the bottleneck channel determined by the intermediate node for the packet's source-destination combination. The bottleneck channel may be viewed as the channel whose impact should be minimized to select an optimum route through the network. In some embodiments, an intermediate node may route packets that have the same destination node differently when, for example, they have different source nodes. In some embodiments, the next-hop node and channel may be selected to reduce contention in the network 100. In some embodiments, the next-hop node and channel may be selected to increase channel diversity (i.e., use of different channels) along a path to the destination node, although the scope of the invention is not limited in this respect. A bottleneck channel may be determined for a particular route and may be associated with a source-destination pair. The bottleneck channel may be the channel that if it were to be used for forwarding packets between the source-destination pair, increased channel contention, reduced channel diversity and/or increased congestion may result. Accordingly, the impact of the bottleneck channel may be minimized in selecting a more optimum route. The determination of a bottleneck channel for a source-destination combination is discussed in more detail below.

Figure 2:
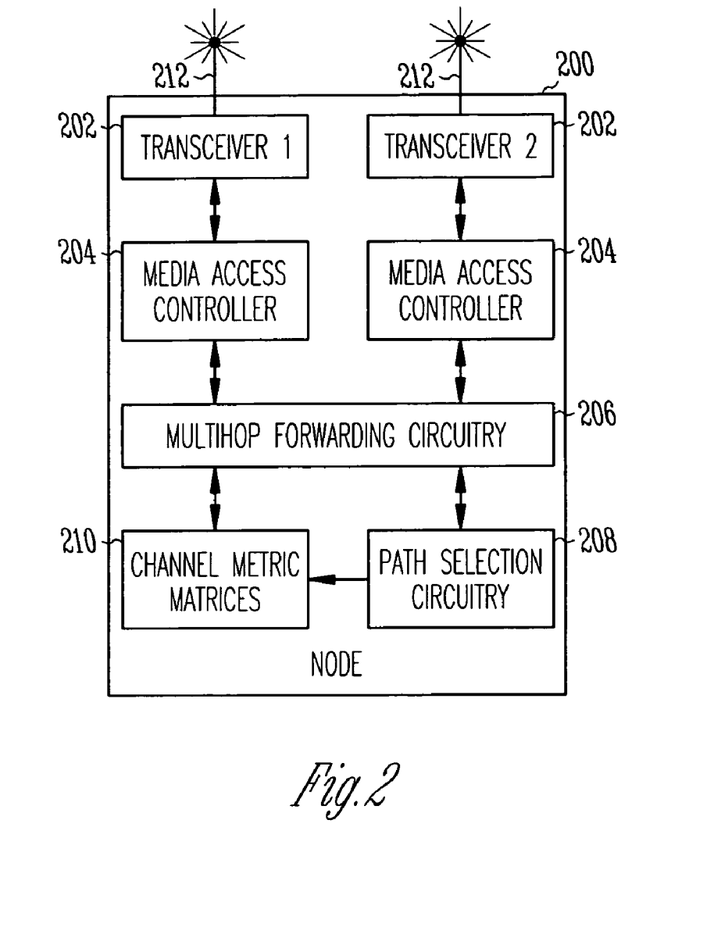
FIG. 2 is a functional block diagram of a multichannel wireless communication node in accordance with some embodiments of the present invention.

FIG. 2 is a functional block diagram of a multichannel wireless communication node in accordance with some embodiments of the present invention. Multichannel wireless communication node 200 may be suitable for use as any one or more of multichannel wireless communication nodes 102 (FIG. 1). In some embodiments, multichannel wireless communication node 200 may be a multichannel wireless mesh network router, although the scope of the invention is not limited in this respect.

In accordance with some embodiments, multichannel wireless communication node 200 may include one or more transceivers 202. Each transceiver 202 may be associated with a particular wireless communication channel. Multichannel wireless communication node 200 may also include media access controllers 204 associated with transceivers 202. Multichannel wireless communication node 200 may also comprise multihop forwarding circuitry 206 for forwarding packets and path selection circuitry 208 to generate channel-metric matrices 210 and select next-hop nodes as described in more detail below. Although the term "circuitry" is used to describe several elements of communication node 200, this does not necessarily imply the use of circuit hardware. As used herein, "circuitry" may include hardware, firmware and software implementations including combinations thereof.

Multichannel wireless communication node 200 may also be coupled with one or more antennas 212 for communicating over wireless communication channels 104 (FIG. 1). Although node 200 illustrates two separate transceivers 202 for communicating with two communication channels, in some embodiments a single transceiver may be used for communicating over two or more communication channels, although the scope of the invention is not limited in this respect.

In accordance with some embodiments of the present invention, path selection circuitry 208 generates a channel-metric matrix for destination nodes of a mesh network. In some embodiments, the matrix may include the cost to reach a given destination and may maintain sufficient information to identify routes in a multihop, multichannel mesh network, such as network 100 (FIG. 1). An example of a channel-metric matrix generated by a node 'M' for a source node 'S' and a destination 'D' in a multichannel mesh network is shown below:

$$metric_{S \to D}^{M} = \begin{matrix} 1 \\ 2 \\ \vdots \\ n \end{matrix} \begin{bmatrix} X_1^1 & X_2^1 & \ldots & X_n^1 & Next_D^1 \\ X_1^2 & X_2^2 & \ldots & X_n^2 & Next_D^2 \\ \vdots & \vdots & & \vdots & \vdots \\ X_1^n & X_2^n & \ldots & X_n^n & Next_D^n \end{bmatrix}$$

In this example, each transceiver 202 (FIG. 2) may use one of n channels, and n may range from one to four or more. The $X_i$ values in each row of the matrix may represent the cost contributed by links on channel i, and $Next_D$ may represent the next-hop node to destination node 'D'. Each row of the matrix may represent the cost to reach the destination through the specified next-hop node, given that a particular channel is a bottleneck channel in the end-to-end path. A bottleneck channel may be created by contention, for example, when multiple links along a path are competing for bandwidth in the same channel. In accordance with some embodiments of the present invention, a source node 'S' may determine the bottleneck channel for the end-to-end path from itself to a destination node 'D'. Furthermore, an intermediate node 'M' in the path from source node 'S' to destination node 'D' may also determine which channel is the bottleneck channel for the end-to-end path from source node 'S' to destination node 'D'. In the example matrix above, the bottleneck channel is listed for each row left of the matrix.

In some embodiments, a routing matrix used in multichannel network 100 (FIG. 1) may include a matrix for each destination. To send a locally originated packet, a node identifies the matrix corresponding to the packet's destination and may select the row in which MAX ($X_i$) is minimized (e.g., minimizing contention). In some alternate embodiments, another function of the values in that row may be minimized. The selected row may represent the bottleneck channel with the least impact on performance. The next-hop node identified in that row and the associated transmission channel may be used as the next-hop node and transmission channel to reach the destination node.

To forward a packet, an intermediate node may obtain the matrix for the destination of a packet from channel-metric matrices 210 (FIG. 2). To select the row of the matrix containing the correct next-hop, the intermediate node may first determine which channel is the bottleneck channel for the path from the source node to the destination node. The bottleneck channel may have already been determined by the source (or the destination) node, which may have generated the channel-metric matrix for the entire path; however an intermediate node may not have this information.

In some embodiments, the bottleneck channel may be determined by either the source or the destination node and may be communicated to the nodes along the path. In these embodiments a packet sent along the path may specify the bottleneck channel for a source-destination pair. In some embodiments that implement a reactive routing protocol, this signaling may be part of a route reply packet. In a proactive routing protocol, an explicit end-to-end message may be used.

In some embodiments, explicit signaling by either the source node or the destination node is not required. In some of these embodiments, an intermediate node may determine the bottleneck channel using the channel-metric matrices associated with a packet's destination node and the packet's source node. In this way, the bottleneck channel can be efficiently determined without requiring explicit signaling. Some conventional routers, on the other hand, may run a Dijkstra-type routing algorithm for all source-destination pairs, which is very computationally expensive.

To illustrate some embodiments of how an intermediate node determines a bottleneck channel, consider a path in a multichannel mesh network from a node 'A' to a node 'C' that flows through node 'B'. Node 'A' may be the packet's source node and node 'C' may be the packet's destination node. Node 'B' may be any intermediate node on a multihop route or path between node 'A' and node 'C'. In accordance with some embodiments of the present invention, node 'B' may identify the bottleneck channel using locally available information. In accordance with some embodiments, node 'B' may use the channel-metric matrix it may have previously generated for node A as a destination node, and may use the channel-metric matrix it may have previously generated for node 'C' as a destination node. An example of a previously generated channel matrix for node 'A' as a destination node is illustrated below:

$$metric_{B \to A}^{B} = \begin{bmatrix} A_1^1 & \ldots & A_n^1 & Next_A^1 \\ \vdots & & \vdots & \vdots \\ A_1^n & \ldots & A_n^n & Next_A^n \end{bmatrix}$$

An example of a previously generated channel matrix for node 'C' as a destination node is illustrated below:

$$metric_{B \to C}^{B} = \begin{bmatrix} C_1^1 & \ldots & C_n^1 & Next_C^1 \\ \vdots & & \vdots & \vdots \\ C_1^n & \ldots & C_n^n & Next_C^n \end{bmatrix}$$

In accordance with some embodiments, path selection circuitry 208 of node 'B' may compute a new matrix as illustrated below:

$$metric_{A \to C}^{B} = \begin{bmatrix} A_1^1 + C_1^1 & \ldots & A_n^1 + C_n^1 & Next_C^1 \\ \vdots & & \vdots & \vdots \\ A_1^n + C_1^n & \ldots & A_n^n + C_n^n & Next_C^n \end{bmatrix}$$

Path selection circuitry 208 (FIG. 2) of node 'B' may use the new matrix to determine the bottleneck channel for the path from node 'A' to node 'C'. This may be done in the same way that node 'A' would use its matrix for node 'C' ($metric_{A \to C}^{A}$) to identify the bottleneck channel. Path selection circuitry 208 (FIG. 2) of node 'B' may select the row of the new matrix for which MAX ($X_i$) is minimized, although the scope of the invention is not limited in this respect. Alternatively, another function of the $X_i$ values in each row may be minimized.

The new matrix $metric_{A \to C}^{B}$ (as computed above) may not necessarily be the same as the matrix $metric_{A \to C}^{A}$ (i.e., the metric computed by node 'A'), however, when node 'B' is on a selected path from node 'A' to node 'C', the minimal row of $metric_{A \to C}^{B}$ may also be the minimal row of $metric_{Z \to C}^{A}$. In this way, node 'B' along a selected path from source node 'A' to destination node C may determine the bottleneck channel and select a next-hop for forwarding packets from source node 'A' to destination node 'C'.

Path selection circuitry 208 (FIG. 2) may perform these computations with minimal computational overhead. Furthermore, no signaling may necessarily be required to inform intermediate nodes along the path of the selected bottleneck channel. In addition, intermediate nodes need not maintain a mapping of source and destination pairs to bottleneck channel (or next-hop), which may require significant storage complexity. In some embodiments, a soft cache of these mappings may optionally be maintained for source-destination pairs to reduce the need to perform the bottleneck-channel computation for each packet.

Once the bottleneck channel (e.g., row of the channel-metric matrix) has been determined by an intermediate node, a next-hop can be identified. An intermediate node may route a packet by first determining the packet's destination node and then identifying the channel-metric matrix for the destination node from matrices stored in channel-metric matrices 210. The next-hop node may then identified by selecting the row corresponding to the bottleneck channel previously determined by combining the source and destination node channel-metric matrices.

In some embodiments, the packet may identify a source node and a destination node in a multichannel mesh network. Path selection circuitry 208 may combine a first channel-metric matrix associated with the packet's source node and a second channel-metric matrix associated with the packet's destination node and may select a next-hop node and an associated transmission channel based on metrics elements of the combined matrix for use in forwarding the packet to its destination node.

In some embodiments, path selection circuitry 208 may select the next-hop node and associated transmission channel to increase diversity among the wireless communication channels used on a route to the destination node. In some embodiments, node 200 may comprise a storage element (e.g., element 210) to store a channel-metric matrix for each possible destination in the network as a destination node. At least some of the channel-metric matrices may identify more than one possible next-hop node and an associated one of the wireless communication channels (i.e., a transmission channel) for reaching (i.e., transmitting packets to) the matrix's associated destination node. For each channel that can be identified as a possible bottleneck channel, a matrix may identify a different next-hop node and associated transmission channel to use. In some embodiments, the channel-metric matrices are generated and stored for each destination node and may comprise a channel metric vector ($X_0, X_1 \ldots X_i$) for next-hop nodes. In some embodiments, the channel metric vectors may comprise a channel metric for each of the communication channels indicating a usage of the communication channel for a path through the network to the destination node associated with the channel-metric matrix. In some embodiments, elements of the channel metric vectors are each associated with one of the communication channels and comprise a weighted combination of one or more of a hop count, link bandwidth, airtime estimate, and data rate for the associated channels, although the scope of the invention is not limited in this respect. In some embodiments, elements of the channel metric vectors may be based on link speed, noise, signal-to-noise ratio, reliability, or other link factors.

In some embodiments, path selection circuitry 208 may combine a first channel-metric matrix associated with the packet's source node and a second channel-metric matrix associated with the packet's destination node to generate a new channel-metric matrix. Each channel metric vector ($X_0, X_1 \ldots X_i$) (e.g., row) of the new channel-metric matrix may have a maximum channel metric, and path selection circuitry 208 may select one of the channel metric vectors (e.g., a row) having a minimum value of the maximum channel metrics. The selected channel metric vector may be associated with a bottleneck channel for that source-destination pair, and the selected vector may also be associated with the next-hop node and a transmission channel for forwarding the received packet.

In some embodiments, path selection circuitry 208 may combine elements of the first channel-metric matrix associated with the packet's source node and elements of the second channel-metric matrix associated with the packet's destination node to generate the new channel-metric matrix by weighting the elements equally. In some alternate embodiments, path selection circuitry 208 may combine elements of the first channel-metric matrix associated with the packet's source node and elements of the second channel-metric matrix associated with the packet's destination node to generate the new channel-metric matrix by weighting the elements in accordance with a weighting algorithm. The weighting algorithm may weight elements based on latency (e.g., related to hop count) or throughput, although the scope of the invention is not limited in this respect.

In some embodiments, the path selection circuitry may generate the channel-metric matrix for destination nodes of the network by construction of paths through the network to destination nodes on a hop-by-hop basis by separately retaining cost contributions of each of the communication channels in the form of a channel metric vector for each candidate path. In some embodiments, channels used for communication between nodes of a multicarrier mesh network may include packet switched channels, time-division multiplexed channels (e.g., use of time slots), frequency division multiplexed channels, code division multiplexed channels, or other channel allocation techniques.

In some embodiments, wireless communication node 200 may transmit and receive orthogonal frequency division multiplexed (OFDM) communication signals. In some embodiments, transceivers 202 may transmit and receive on multicarrier communication channels. The multicarrier communication channel may be within a predetermined frequency spectrum and may comprise a plurality of orthogonal subcarriers. In some embodiments, the orthogonal subcarriers may be closely spaced symbol-modulated subcarriers. To help achieve orthogonality between the closely spaced subcarriers of an OFDM signal, each subcarrier may have a null at substantially a center frequency of the other subcarriers. In some embodiments, to help achieve orthogonality between the closely spaced subcarriers of an OFDM signal, each subcarrier may have an integer number of cycles within a symbol period. In some embodiments, the orthogonality between the different communication channels 104 (FIG. 1) may be achieved through a frequency-division multiplexing (FDM) technique, a time-division multiplexing (TDM) technique, a code-division multiplexing (CDM) technique, or combinations thereof.

In some embodiments, the frequency spectrums for the multicarrier communication channels may comprise either a 5 GHz frequency spectrum or a 2.4 GHz frequency spectrum. In these embodiments, the 5 GHz frequency spectrum may include frequencies ranging from approximately 4.9 to 5.9 GHz, and the 2.4 GHz spectrum may include frequencies ranging from approximately 2.3 to 2.5 GHz, although the scope of the invention is not limited in this respect, as other frequency spectrums are also equally suitable.

In some embodiments, multichannel wireless communication node 200 may transmit and/or receive RF communications in accordance with specific communication standards, such as the Institute of Electrical and Electronics Engineers (IEEE) standards including IEEE 802.11(a), 802.11(b), 802.11(g) and/or 802.11(h) standards for wireless local area networks (WLANs) or the IEEE 802.11(s) standard for mesh networks, although multichannel wireless communication node 200 may also be suitable to transmit and/or receive communications in accordance with other techniques. Antennas 212 may comprise directional or omnidirectional antennas, including, for example, dipole antennas, monopole antennas, patch antennas, loop antennas, microstrip antennas or other types of antennas suitable for reception and/or transmission of RF signals.

In some embodiments, multichannel wireless communication node 200 may be almost any device that operates as a wireless router including a personal digital assistant (PDA), a laptop or portable computer with wireless communication capability, a web tablet, a wireless telephone, a wireless headset, a pager, an instant messaging device, a digital camera, an access point or other device that may receive and/or transmit information wirelessly. Although multichannel wireless communication node 200 is illustrated as a wireless communication device, multichannel wireless communication node 200 may be almost any wireless or wireline communication device, including a general purpose processing or computing system. In some embodiments, multichannel wireless communication node 200 may be a battery-powered device.

Although multichannel wireless communication node 200 is illustrated as having several separate functional elements, one or more of the functional elements may be combined and may be implemented by combinations of software-configured elements, such as processing elements including digital signal processors (DSPs), and/or other hardware elements. For example, processing elements may comprise one or more microprocessors, DSPs, application specific integrated circuits (ASICs), and combinations of various hardware and logic circuitry for performing at least the functions described herein. In some embodiments, the functional elements of multichannel wireless communication node 200 may refer to one or more processes operating on one or more processing elements.

Figure 3:
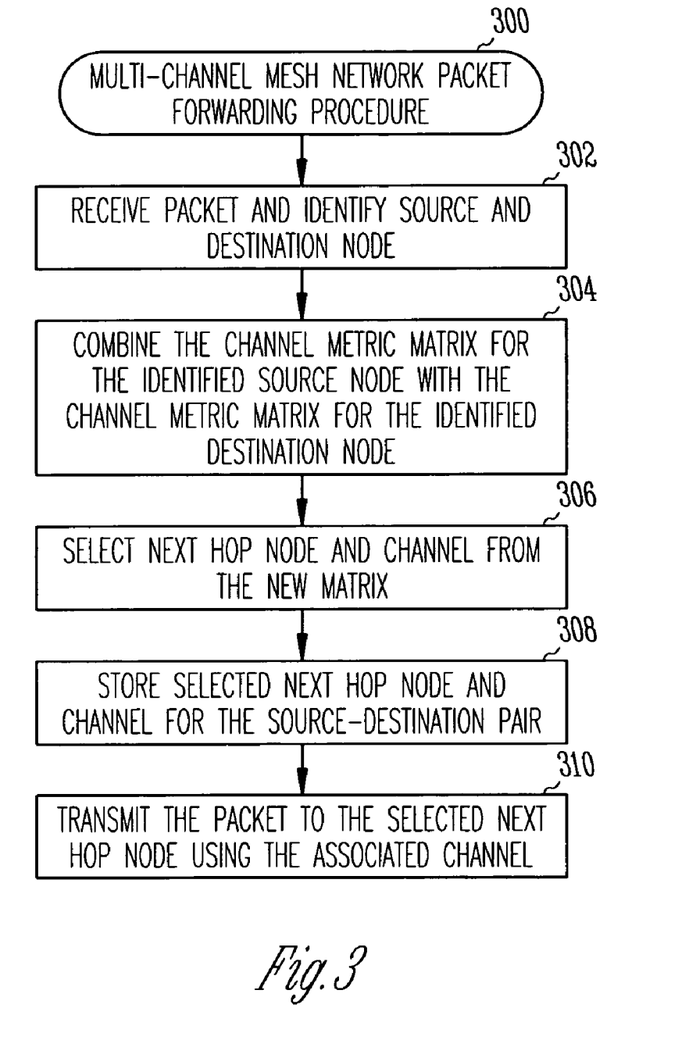
FIG. 3 is a flow chart of a packet forwarding procedure in accordance with some embodiments of the present invention.

FIG. 3 is a flow chart of a packet forwarding procedure in accordance with some embodiments of the present invention. In some embodiments, packet forwarding procedure 300 may be performed by an intermediate node of a multichannel mesh network for forwarding a current packet between a source and a destination node of the network. In some embodiments, packet forwarding procedure 300 may be performed by a multichannel wireless mesh network router, such as node 200 (FIG. 2), although the scope of the invention is not limited in this respect. Single channel mesh routers may also be suitable for performing procedure 300.

In operation 302, a packet is received and the packet's source node and the packet's destination node may be determined from information (e.g., a header) within the packet. Operation 302 also comprises identifying a channel-metric matrix for the packet's source node and a channel-metric matrix for the packet's destination node. Operation 302 may be performed by multihop forwarding circuitry 206 (FIG. 2) and path selection circuitry 208 (FIG. 2), although the scope of the invention is not limited in this respect.

Operation 304 comprises combining the channel-metric matrix identified for the packet's source node with the channel-metric matrix identified for the packet's destination node. The combining of these matrices may be performed in accordance with one or more linear combination techniques discussed above.

Operation 306 comprises selecting a next-hop node and associated communication channel based on the elements of the combined channel-metric matrix generated in operation 304. In some embodiments, a row having a lowest maximum metric may be selected, although the scope of the invention is not limited in this respect. The selected row may correspond to a bottleneck channel of the channel-metric matrix for the packet's destination node.

Operation 308 comprises storing the next-hop node and bottleneck channel for the source-destination associated with the packet. In this way, the determination of the bottleneck channel may need to be done only once for a source-destination pair under current channel conditions. Operations 304 through 308 may be performed by path selection circuitry 208 (FIG. 2), although the scope of the invention is not limited in this respect.

Operation 310 comprises transmitting (i.e., forwarding) the packet to the next-hop node based on the identified row using the associated transmission channel determined in operation 306. Operation 310 may be performed multihop forwarding circuitry 206 (FIG. 2) and one of transceivers 202 (FIG. 2), although the scope of the invention is not limited in this respect.

Although the individual operations of procedure 300 are illustrated and described as separate operations, one or more of the individual operations may be performed concurrently, and nothing requires that the operations be performed in the order illustrated.

The use of multiple transceivers by a mesh router may enable improved system performance. The use of multiple transceivers by a mesh router may enable full-duplex communication allowing a node to receive on one radio while simultaneously transmitting on a second radio. The use of multiple transceivers may also allow more than one link along a multi-hop path to be active at a time, even if all of the links in the path are within interference range of each other by allowing different links to use different non-interfering channels.

Figure 4:
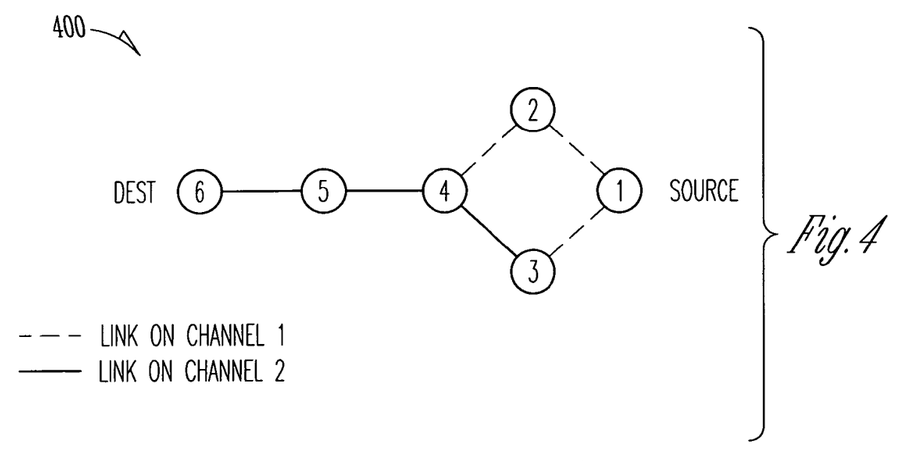
FIG. 4 is an example of a multichannel mesh network.
Figure 5:
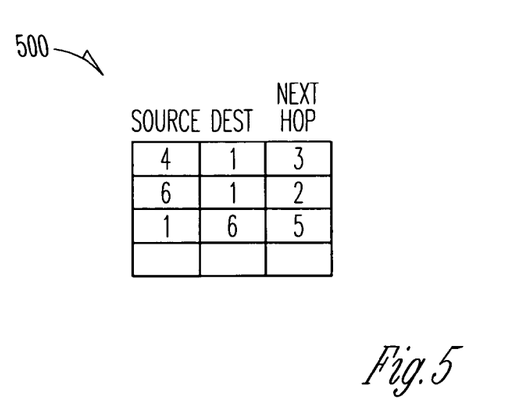
FIG. 5 is an example of routing table for a multichannel mesh network.

FIG. 4 is an example of a multichannel mesh network. Multichannel mesh network 400 may be used to illustrate an example in which the use of a distance-vector does not result in an optimal path from source node one to destination node four. In this example, the optimal path for node four to node one is the path from node four to node three to node one (i.e., 4-3-1) (which minimizes the interference between the two hops from node four to node one), while the optimal path from node six to node one is the path from node six to node five to node four to node two to node one (i.e., 6-5-4-2-1). In some embodiments, link-state routing may be used to find optimal paths in a multi-channel network. Packets forwarded by a node toward a given destination may utilize a different next hop than packets originating on that node for the same destination. FIG. 5 is an example of routing table for a multichannel mesh network. Routing table 500 may illustrate entries for node four of network 400 (FIG. 4).

Figure 6:
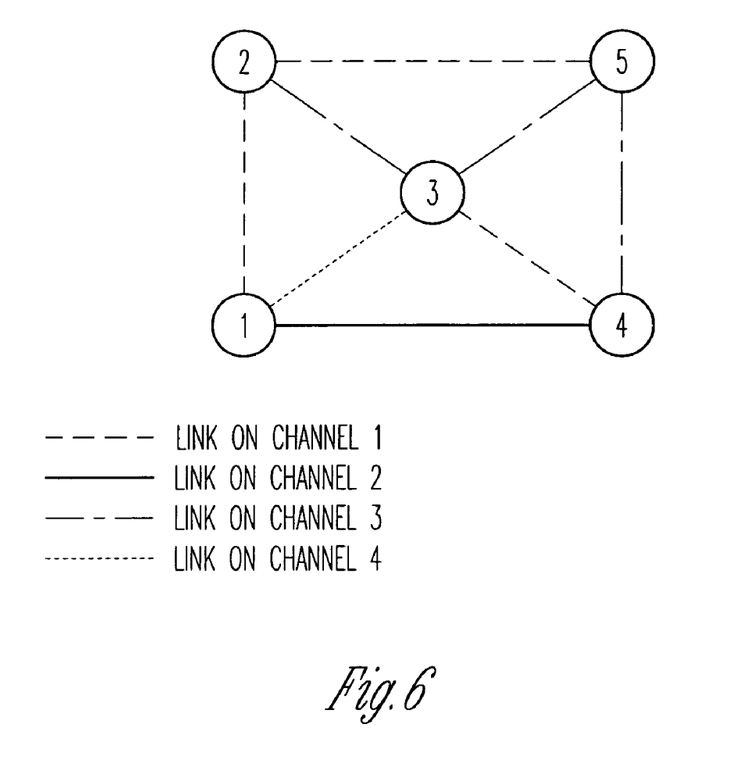
FIG. 6 is an example of multichannel mesh network that uses four communication channels.

FIG. 6 is an example of multichannel mesh network that uses four communication channels. In mesh network 600, assume that the cost for the use of each link has a value of one and that a goal is to minimize interference between channels. Based on this goal, a path through network 600 that minimizes the maximum number of links that use the same channel is desirably determined. For example, for a packet to be routed from node one to node five, node one would look in its routing table and find the following matrix:

$$metric^1_{1\to 5} \begin{bmatrix} 0 & 0 & 1 & 1 & next=3 \\ 0 & 0 & 1 & 1 & next=3 \\ 2 & 0 & 0 & 0 & next=2 \\ 0 & 1 & 1 & 0 & next=4 \end{bmatrix}$$

Node one may then select channels one, two or four as the bottleneck channel, since none of these choices has any channel contention. If either channel one or channel two is selected, and the packet is forwarded to node three. Node three may use the following computation to determine the bottleneck channel:

$$metric^3_{3\to 1} + metric^3_{3\to 5} = \begin{bmatrix} 0 & 0 & 0 & 1 & next=1 \\ 0 & 0 & 0 & 1 & next=1 \\ 0 & 0 & 0 & 1 & next=1 \\ 1 & 0 & 1 & 0 & next=2 \end{bmatrix} +$$

-continued $$\begin{bmatrix} 0 & 0 & 1 & 0 & next=5 \\ 0 & 0 & 1 & 0 & next=5 \\ 2 & 0 & 0 & 1 & next=1 \\ 0 & 0 & 1 & 0 & next=5 \end{bmatrix} = \begin{bmatrix} 0 & 0 & 1 & 1 & next=5 \\ 0 & 0 & 1 & 1 & next=5 \\ 2 & 0 & 0 & 2 & next=1 \\ 1 & 0 & 2 & 0 & next=5 \end{bmatrix}.$$

Note that the rows for channels one and two computed at node three are the same as the rows computed by node one. This may occur because node three is on the path from node one, assuming that either channel one or channel two is the bottleneck channel. The other two rows are both different and worse choices than they were at node one. Thus, node three can make the same choice as node one and correctly forward the packet toward the destination.

If node one chose channel four as the bottleneck channel, it will forward to node four. Node four may use the following computation to determine the bottleneck channel:

$$metric^4_{4\to 1} + metric^4_{4\to 5} = \begin{bmatrix} 0 & 1 & 0 & 0 & next=1 \\ 1 & 0 & 0 & 1 & next=3 \\ 0 & 1 & 0 & 0 & next=1 \\ 0 & 1 & 0 & 0 & next=1 \end{bmatrix} +$$

$$\begin{bmatrix} 0 & 0 & 1 & 0 & next=5 \\ 0 & 0 & 1 & 0 & next=5 \\ 2 & 1 & 0 & 0 & next=1 \\ 0 & 0 & 1 & 0 & next=5 \end{bmatrix} = \begin{bmatrix} 0 & 1 & 1 & 0 & next=5 \\ 1 & 0 & 1 & 1 & next=5 \\ 2 & 2 & 0 & 0 & next=1 \\ 0 & 1 & 1 & 0 & next=5 \end{bmatrix}$$

Thus, at node four, the same bottleneck channels are available, and node four chooses the same path as node one.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, computing device includes one or more processing elements coupled with computer-readable memory that may be volatile or non-volatile memory or a combination thereof.

Embodiments may be implemented in one or a combination of hardware, firmware and software. Embodiments may also be implemented as instructions stored on a computer-readable medium, which may be read and executed by at least one processor to perform the operations described herein. A computer-readable medium may include any mechanism for storing or transmitting information in a form readable by a machine (e.g., a computer). For example, a computer-readable medium may include read-only memory (ROM), random-access memory (RAM), magnetic disk storage media, optical storage media, flash-memory devices, and other storage devices and media.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus the following claims are hereby incorporated into the detailed description, with each claim standing on its own as a separate preferred embodiment.

What is claimed is:

1. A wireless mesh network router comprising:
at least one transceiver to receive a packet over a wireless communication channel of a plurality of wireless channels, the packet identifying a source node and a destination node in a multichannel mesh network; and
path selection circuitry to combine a first channel-metric matrix associated with the packet's source node and a second channel-metric matrix associated with the packet's destination node to identify a bottleneck channel of the plurality of channels for source-destination pair, the path selection circuitry to select a next-hop node and an associated transmission channel based on metrics of the combined matrix including based on the identified bottleneck channel,
wherein the path selection circuitry is configured to generate a channel-metric matrix for destination nodes of the network by construction of paths through the network to the destination nodes on a hop-by-hop basis by separately retaining cost contributions of each of the communication channels in the form of a channel metric vector for each candidate path for use in identifying bottleneck channels for source-destination pairs.

2. The router of claim 1 further comprising more than one transceiver, wherein each of the transceivers is configured to receive and transmit packets on one of a plurality of wireless communication channels,
wherein the wireless mesh network router is one node of a plurality of nodes of the multichannel mesh network, and
wherein at least some of the nodes of the plurality communicate therebetween over more than one of the wireless communication channels.

3. The router of claim 2 wherein the wireless communication channels used by the nodes of the network comprise orthogonal frequency division multiplexed communication channels, each having a plurality of subcarriers.

4. The router of claim 2 wherein the path selection circuitry is configured to select the next-hop node and associated transmission channel to increase diversity among the wireless communication channels used on a route to the destination node.

5. The router of claim 2 further comprising a storage element to store a channel-metric matrix for each node of the network,
wherein at least some of the channel-metric matrices identify more than one next-hop node and an associated one of the wireless communication channels for reaching the associated destination node.

6. The router of claim 5 wherein the channel-metric matrices are stored for each destination node and comprise a channel metric vector for next-hop nodes,
wherein the channel metric vectors comprise a channel metric for each of the communication channels indicating a usage of the communication channel for a path through the network to the destination node associated with the channel-metric matrix.

7. The router of claim 6 wherein elements of the channel metric vectors are each associated with one of the communication channels and comprise a weighted combination of one or more of a hop count, link bandwidth, airtime estimate, and data rate for the associated channels.

8. The router of claim 6 wherein the path selection circuitry is configured to combine the first channel-metric matrix associated with the packet's source node and the second channel-metric matrix associated with the packet's destination node to generate a new channel-metric matrix,
wherein each channel metric vector of the new channel-metric matrix has a maximum channel metric,
wherein the path selection circuitry is configured to select one of the channel metric vectors having a minimum value of the maximum channel metrics, and
wherein the selected vector is associated with the next-hop node and a transmission channel for routing the packet.

9. The router of claim 8 wherein the path selection circuitry is configured to combine elements of the first channel-metric matrix associated with the packet's source node and elements of the second channel-metric matrix associated with the packet's destination node to generate the new channel-metric matrix by weighting the elements equally.

10. The router of claim 8 wherein the path selection circuitry is configured to combine elements of the first channel-metric matrix associated with the packet's source node and elements of the second channel-metric matrix associated with the packet's destination node to generate the new channel-metric matrix by weighting the elements in accordance with a weighting algorithm.

11. A method of forwarding packets in a multichannel mesh network comprising:
receiving a packet over a wireless communication channel of a plurality of wireless channels, the packet identifying a source node and a destination node in a multichannel mesh network;
combining a first channel-metric matrix associated with the packet's source node and a second channel-metric matrix associated with the packet's destination node to identify a bottleneck channel of the plurality of channels for the source-destination pair,
selecting a next-hop node and an associated transmission channel based on metrics of the combined matrix including based on the identified bottleneck channel, and
generating a channel-metric matrix for destination nodes of the network by construction of paths through the network to destination nodes on a hop-by-hop basis by separately retaining cost contributions of each of a plurality of communication channels in the form of a channel metric vector for each candidate path for use in identifying bottleneck channels for source-destination pairs.

12. The method of claim 11 wherein the receiving, combining and selecting are performed by a wireless mesh network router that is one node of a plurality of nodes of the multichannel mesh network, and
wherein at least some of the nodes of the plurality communicate therebetween over more than one of a plurality of wireless communication channels.

13. The method of claim 12 wherein the wireless communication channels used by the nodes of the network comprise orthogonal frequency division multiplexed communication channels, each having a plurality of subcarriers.

14. The method of claim 12 wherein selecting comprises selecting the next-hop node and associated transmission channel to increase diversity among the wireless communication channels used on a route to the destination node.

15. The method of claim 12 further comprising storing a channel-metric matrix for each node of the network,
wherein at least some of the channel-metric matrices identify more than one next-hop node and an associated one of the wireless communication channels for reaching the associated destination node.

16. The method of claim 15 wherein the channel-metric matrices are stored for each destination node and comprise a channel metric vector for next-hop nodes,
wherein the channel metric vectors comprise a channel metric for each of the communication channels indicating a usage of the communication channel for a path through the network to a destination node associated with the channel-metric matrix.

17. The method of claim 16 wherein elements of the channel metric vectors are each associated with one of the communication channels and comprise a weighted combination of one or more of a hop count, link bandwidth, airtime estimate, and data rate for the associated channels.

18. The method of claim 16 wherein combining comprises combining the first channel-metric matrix associated with the packet's source node and the second channel-metric matrix associated with the packet's destination node to generate a new channel-metric matrix,
wherein each channel metric vector of the new channel-metric matrix has a maximum channel metric, and
wherein the method further comprises selecting one of the channel metric vectors having a minimum value of the maximum channel metrics, the selected vector being associated with the next-hop node and a transmission channel for forwarding the packet.

19. The method of claim 18 wherein combining comprises combining elements of the first channel-metric matrix associated with the packet's source node and elements of the second channel-metric matrix associated with the packet's destination node to generate the new channel-metric matrix by weighting the elements equally.

20. The method of claim 18 wherein combining comprises combining elements of the first channel-metric matrix associated with the packet's source node and elements of the second channel-metric matrix associated with the packet's destination node to generate the new channel-metric matrix by weighting the elements in accordance with a weighting algorithm.

21. A system comprising:
one or more substantially omnidirectional antennas;
at least one transceiver coupled to the at least one antenna to receive a packet over a wireless communication channel of a plurality of wireless channels, the packet identifying a source node and a destination node in a multichannel mesh network; and
path selection circuitry to combine a first channel-metric matrix associated with the packet's source node and a second channel-metric matrix associated with the packet's destination node to identify a bottleneck channel of the rlurality of channels for the source-destination pair, and to select a next-hop node and an associated transmission channel based on metrics of the combined matrix, wherein the path selection circuitry is configured generate the channel-metric matrix for destination nodes of the network by construction of paths through the network to destination nodes on a hop-by-hop basis by separately retaining cost contributions of each of a plurality of communication channels in the form of a channel metric vector for each candidate path for use in identifying bottleneck channels for source-destination pairs.

22. The system of claim 21 further comprising more than one transceiver, wherein each of the transceivers is configured to receive and transmit packets on one of a plurality of wireless communication channels,
wherein the wireless mesh network router is one node of a plurality of nodes of the multichannel mesh network, and
wherein at least some of the nodes of the plurality communicate therebetween over more than one of the wireless communication channels.

23. The system of claim 22 further comprising a storage element to store a channel-metric matrix for each node of the network,
wherein at least some of the channel-metric matrices identify more than one next-hop node and an associated one of the wireless communication channels for reaching the associated destination node.

24. The system of claim 23 wherein the channel-metric matrices are stored for each destination node and comprise a channel metric vector for next-hop nodes,
wherein the channel metric vectors comprise a channel metric for each of the communication channels indicating a usage of the communication channel for a path through the network to the destination node associated with the channel-metric matrix.

25. A computer-readable medium that stores executable instructions for execution by one or more processors to perform operations comprising:
receiving a packet over a wireless communication channel of a plurality of wireless channels, the packet identifying a source node and a destination node in a multichannel mesh network;
combining a first channel-metric matrix associated with a packet's source node and a second channel-metric matrix associated with the packet's destination node to identify a bottleneck channel of the plurality of channels for the source-destination pair:
selecting a next-hop node and an associated transmission channel based on metrics of the combined matrix including based on the identified bottleneck channel; and
generating the channel-metric matrices for destination nodes of the network by construction of paths throucih the network to destination nodes on a hop-by-hop basis by separately retaining cost contributions of each of a plurality of communication channels in the form of a channel metric vector for each candidate path for use in identifying bottleneck channels for source-destination pairs.

26. The computer-readable medium of claim 25,
wherein the receiving, combining and selecting are performed by a wireless mesh network router that is one node of a plurality of nodes of the multichannel mesh network, and
wherein at least some of the nodes of the plurality communicate therebetween over more than one of a plurality of wireless communication channels.

27. The computer-readable medium of claim 26 further comprising:
storing a channel-metric matrix for each node of the network, wherein at least some of the channel-metric matrices identify more than one next-hop node and an associated one of the wireless communication channels for reaching the associated destination node.

28. The computer-readable medium of claim 27,
wherein the channel-metric matrices are stored for each destination node and comprise a channel metric vector for next-hop nodes,
wherein the channel metric vectors comprise a channel metric for each of the communication channels indicating a usage of the communication channel for a path through the network to the destination node associated with the channel-metric matrix.

* * * * *

UNITED STATES PATENT AND TRADEMARK OFFICE
CERTIFICATE OF CORRECTION

PATENT NO. : 7,471,633 B2  Page 1 of 1
APPLICATION NO. : 11/030593
DATED : December 30, 2008
INVENTOR(S) : Yarvis et al.

It is certified that error appears in the above-identified patent and that said Letters Patent is hereby corrected as shown below:

On the Title page, Item (54), line 1, delete "MULTICHANNEL," and insert -- MULTICHANNEL --, therefor.

In column 1, line 1, delete "MULTICHANNEL," and insert -- MULTICHANNEL --, therefor.

In column 13, line 52, in Claim 21, delete "rlurality" and insert -- plurality --, therefor.

In column 14, line 32, in Claim 25, delete "pair:" and insert -- pair; --, therefor.

In column 14, line 37, in Claim 25, delete "throucih" and insert -- through --, therefor.

Signed and Sealed this

Twenty-fourth Day of March, 2009

JOHN DOLL
*Acting Director of the United States Patent and Trademark Office*